United States Patent [19]

Gudnason et al.

[11] 4,391,830
[45] Jul. 5, 1983

[54] PRODUCTION OF LIQUID YOGURT STABILIZED WITH HIGH METHOXYL PECTIN

[75] Inventors: Geir V. Gudnason, Atlanta; Laurie M. Crowe, Smyrna; Shin S. Chang, Stone Mountain, all of Ga.

[73] Assignee: Coca Cola Company, Atlanta, Ga.

[21] Appl. No.: 265,885

[22] Filed: May 21, 1981

[51] Int. Cl.$^3$ .............................................. A23C 9/12
[52] U.S. Cl. ...................................... 426/43; 426/61; 426/583; 426/330.2
[58] Field of Search ................. 426/583, 577, 590, 43, 426/61, 330.2

[56] References Cited

U.S. PATENT DOCUMENTS

| 3,269,842 | 8/1966 | Mayer et al. | 426/43 |
| 3,625,702 | 12/1971 | Exler | 426/583 |
| 3,932,680 | 1/1976 | Egli et al. | 426/43 |
| 3,978,243 | 8/1976 | Pederson | 426/577 |
| 4,110,476 | 8/1978 | Rhodes | 426/41 |
| 4,169,854 | 10/1979 | Igoe | 426/583 |
| 4,178,390 | 12/1979 | Igoe | 426/43 |
| 4,206,244 | 6/1980 | Schenk | 426/583 |
| 4,293,573 | 10/1981 | Bradley, Jr. et al. | 426/583 |

FOREIGN PATENT DOCUMENTS

| 1144091 | 2/1963 | Fed. Rep. of Germany . | |
| 2129853 | 12/1972 | Fed. Rep. of Germany | 426/583 |
| 55-50885 | 4/1980 | Japan | 426/583 |
| 171194 | 11/1953 | Netherlands . | |

OTHER PUBLICATIONS

GENU Service, "Stabilized Yoghurt Drinks", (The Copenhagen Pectin Factory, Ltd.).
GENU Pectin Control Method, dated Jun. 12, 1979.
Gudnason, G. Y. et al., "Fruit Flavored Milk", American Milk Review-Apr. 1960.

Primary Examiner—Raymond N. Jones
Assistant Examiner—Elizabeth J. Curtin

[57] ABSTRACT

High methoxyl pectin is added to an already prepared yogurt to produce a substantially physically and microbiologically stable liquid yogurt. Said pectin is dispersed and dissolved in said yogurt in a manner which avoids the need for high pressure homogenization and subsequent heat treatment thereof to eliminate contaminants.

7 Claims, No Drawings

PRODUCTION OF LIQUID YOGURT STABILIZED WITH HIGH METHOXYL PECTIN

BACKGROUND OF THE INVENTION

The present invention relates to the production of yogurt and, in particular, to a process for the production of liquid yogurt with excellent physical stability and smooth consistency and texture.

1. Field of the Invention

Yogurt comprises a cultured milk product produced by culturing one or more dairy ingredients such as whole milk, partially skimmed milk, skim milk, nonfat dry milk and the like with a characterizing bacterial culture containing *Lactobacillus bulgaricus*, a lactic acid-forming rod-shaped bacterium, and *Streptococcus thermophilus*, a coccus-shaped bacterium able to grow and produce lactic acid at high temperatures. The dairy ingredients are first homogenized and pasteurized at high temperatures and then cooled to about 40° C. to 50° C. for inoculation with the culture to a desired acid content and pH at which curdling or coagulation occurs. Acid development and bacterial growth are arrested by cooling the mixture, generally to a temperature of about 0° C. to about 5° C. Additives such as sugar, fruit, colorants, flavorants and stabilizers may be employed to enhance consumer acceptance of the product.

Yogurts may be of the "firm" or "gel-like" variety or they may be frozen and may be eaten with a spoon. Yogurts also may be made in liquid form and drunk directly or through a straw.

Presently, nearly all yogurt in the United States is rendered "firm" or "gel-like," whereby the yogurt is processed, packaged and marketed so as to present a product having pudding-like consistency. Firm yogurts sometimes exhibit, after a few days standing, a syneresis or bleeding of whey from the body of the yogurt, typically resulting in the presence of a small amount of clear liquid on top of and around the yogurt. This bleeding can be minimized or entirely avoided by increasing the amount of milk solids in the yogurt or by adding suitable stabilizers which increase the firmness of the yogurt.

In general, liquid yogurts are prepared by using methods employed in making firm yogurts with modifications as to, inter alia, the components of the mixture, the severity of heat processing during pasteurization, increased agitation of the inoculated mixture and the like.

Liquid yogurts present particularly difficult problems with respect to stabilization. Coagulated milk proteins, suspended fruit particles and the like will, only a short time after preparation, separate completely from the product and form either a sediment at the bottom of the container, a layer floating at the top of the product or a combination of these undesirable effects. This is attributed to their thin, pourable consistency.

Attempts at overcoming the difficulties described above generally involve resort to techniques utilized in the manufacture of firm yogurts, such as the addition of stabilizers. Many liquid yogurt products have a shelf life expectation of two to three weeks. However, a shelf life of five or six weeks is commercially desirable. It is therefore necessary to stabilize the liquid yogurt using commercial stabilizers. These include plant exudates (e.g., gum arabic), seaweed extracts (e.g., alginates), plant and seed gums (e.g., guar gum), animal derivatives (e.g., gelatin), plant extracts (e.g., pectin). These commercial stabilizers are completely soluble in milk or already prepared yogurt, and may, therefore, be incorporated at any stage of manufacture. However, such large quantities of stabilizers are required to prevent the separation of milk proteins and suspended particles in liquid yogurt that the resultant product is undesirably viscous and/or exhibits off flavors, objectionable color, or an objectionable grainy or chalky texture.

Although the prior art suggests high pressure homogenization of yogurt as a means for obtaining a product of acceptable texture and consistency, such homogenization is difficult and expensive to operate in a sanitary manner and requires that the product be sterilized thereafter, adding yet additional expense. Moreover, pasteurized yogurt products, in which the bacterial culture is completely destroyed, generally are not considered true yogurts.

We have observed that excellent mouthfeel and stability in liquid yogurt as well as special compatability with fruit preparations may be obtained when high methoxyl pectin is incorporated in liquid yogurt. However, these are several factors that make high methoxyl pectin difficult to use in commercial practice.

For example, if high methoxyl pectin is added to milk before pasteurization or at any stage before the yogurt is at pH higher than about 4.6, the pectin will precipitate the milk protein; a sediment will form on the bottom and whey on the top. After mixing the milk with culture, no further agitation can take place if a typical yogurt is to be produced. The culturing of a mixture of precipitate and whey leads to a type of yogurt which is gritty in mouthfeel and completely unsatisfactory. If the high methoxyl pectin is added when pH is lower than 4.6, no precipitation occurs. A product very satisfactory in stability and mouthfeel is obtained, as long as the pectin is incorporated in the yogurt at the appropriate time.

2. Discussion of the Prior Art

High methoxyl pectin has been used to stabilize milk beverages acidified by the addition of edible acids or fruit preparations. In these cases, the pectin and milk mixture is agitated continuously so that a pectin-protein precipitate or sediment will not form. When the mixture is then acidified by edible acids or acid fruit preparations, the pectin and protein no longer act to precipitate each other and the pectin stabilizes the milk protein. Such acidified milk beverages, it should be noted, are quite distinct from yogurt in rheological properties.

Stabilization of said acidified milk beverages is described in Dutch Pat. No. 117,194, July 1952 and in an article by G. V. Gudnason, et al., published in *American Milk Review*, April 1960. The Dutch patent describes a process which comprises pasteurizing or sterilizing the beverages. Such heat treatment solubilizes the pectin so that it will completely stabilize the proteins. In the experiments described by Gudnason, et al., no heat treatment was employed. The results of these experiments showed that the pectin-milk mixture formed a sediment after 48 hours. In the above references there was no homogenization step after the pectin addition. It is believed that heat treatment alters the form of calcium in the milk which enables the pectin to dissolve.

Information booklet (Genu Service 15-01) issued by the Copenhagen Pectin Factory Ltd. in April 1980 states that high methoxyl pectin is not soluble in yogurt due to the form in which calcium is present. High shear forces must be applied to the yogurt-pectin dispersion so that the pectin will properly stabilize the yogurt. It is suggested that this is best achieved by passing the mixture of yogurt and pectin through a homogenizer at a pressure of 1500–2500 psi.

A quality control method for viscosity of high methoxyl pectin issued by the Pectin Factory Ltd. on June 12, 1979, discloses that after thoroughly mixing the pectin and yogurt, the mixture is homogenized at 2250 psi, and that this homogenization will bring the pectin into solution.

Further examples of the use of pectin to stabilize sour milk drinks are described in U.S. Pat. No. 3,625,702 to Exler and U.S. Pat. No. 3,978,243 to Pedersen. Exler discloses the stabilization of sour milk drinks by adding high methoxyl pectin to acid milk and homogenizing the mixture at about 5000 psi prior to pasteurization at an elevated temperature. Pederson describes the manufacture of a gelled sour milk product, wherein high methoxyl pectin, carboxymethylcellulose, or propylene glycol alginate are used to stabilize the sour milk prior to gelling it by electronegatively charged gelling agents such as low methoxyl pectin, carrageenan, or furcellaran. The preferred procedure employs homogenization at 2250 to about 5000 psi when high methoxyl pectin is employed.

Unpasteurized liquid yogurts are expected to have a relatively short shelf life of about two to three weeks. Said products must be sold or utilized before stability problems or microbiological spoilage occurs. Microbiological spoilage generally is caused by yeast and mold contamination during production. The homogenizer is a major source of such contamination because it is so difficult to sanitize. This problem may be prevented by pasteurizing or sterilizing the product as a last step in the processing. However, since this step not only destroys yeasts and molds but also the Lactobacilli and Streptococci, the resultant products may not be considered true yogurts by most persons skilled in the art. A homogenizer can be completely sterilized before use under laboratory conditions, but in commercial practice this is rarely possible.

The present invention satisfies a long felt need to develop a process in which high methoxyl pectin may be incorporated into already prepared yogurt, rendering it physically stable without the need to use high pressure homogenization and subsequent pasteurization or sterilization.

SUMMARY OF THE INVENTION

It is an object of the present invention to provide a process for the manufacture of physically and microbiologically stable, unpasteurized liquid yogurt.

Another object of this invention is to provide a process for the manufacture of a physically and microbiologically stable, unpasteurized liquid yogurt which does not exhibit undesirably high viscosity, off flavors or objectionable colors or mouthfeel.

A further object of this invention is to provide a process for the manufacture of a physically and microbiologically stable, unpasteurized liquid yogurt which does not require that the yogurt be subjected to high pressure homogenization, and subsequent pasteurization or sterilization.

These and other objects are achieved by a process for the manufacture of liquid yogurt, wherein high methoxyl pectin is dispersed in an already prepared liquid yogurt and thereafter the pectin is further dispersed using relatively low pressure homogenization.

In accordance with the present invention, it has now been discovered in a method for preparing a liquid yogurt, wherein pasteurized dairy ingredients are inoculated with a bacterial culture to form said yogurt, the improvement comprising adding high methoxyl pectin to already prepared yogurt and dispersing and dissolving said pectin in said yogurt in a manner which avoids the need for high pressure homogenization and subsequent heat treatment thereof to eliminate contaminants, the amount of said high methoxyl pectin added to said yogurt being effective to produce a substantially physically and microbiologically stable yogurt product.

According to the process of this invention, it is essential that the high methoxyl pectin be added to an already prepared yogurt, i.e., the product existing after pasteurized dairy components have been cultured with the appropriate bacterial culture at conditions at which curdling and coagulation occur. Pectin is not readily soluble in water or milk and will hydrate slowly to form a colloidal solution. Since pectin hydrates more rapidly in hot milk or water, it would be expected that a more appropriate, useful point for its utilization in a yogurt process would be its addition to the dairy ingredients prior to their pasteurization and before the cooling and inoculation procedures, with the additional benefit that microbial contamination from the pectin would be eliminated in this manner.

It has been found, however, that when pectin is added to the dairy ingredients at any time in the process before the yogurt is actually made, i.e., before inoculation with bacterial culture, the yogurt product has a gritty mouthful and exhibits separation of whey and solids after a short time. These problems exist even if the so-prepared yogurt is homogenized at low or high pressure. According to the present invention, high methoxyl pectin, either dry or in the form of a pasteurized aqueous solution, is added to yogurt and incorporated therein in a manner which insures adequate mixing and avoids microbial contamination without the need for high pressure homogenization and subsequent heat treatment.

DETAILED DESCRIPTION OF THE INVENTION

In accordance with the process of the present invention, a liquid yogurt is prepared utilizing known, conventional techniques. For example, dairy ingredients such as milk, skim milk, nonfat dry milk or mixtures thereof are mixed and pasteurized at high temperature, typically in the range of from about 80° C. to about 110° C., preferably at about 85° C. to 95° C., often under high pressure for 3 to 30 minutes. (incident to homogenization). The pasteurized ingredients then are cooled in one or more stages to a temperature in the range of from about 40° C. to about 50° C., preferably at about 45° C., and then inoculated with the conventional, characterizing culture. Culturing is continued for an appropriate time period, preferably from about two to six hours during which time lactic acid forms and the pH of the mixture drops to below about 4.6 and as low as 4.2. As utilized in the context of this invention, the product at this and later points in the process is considered "yogurt" or, alternatively, "made yogurt," "already prepared yogurt" and like expressions used herein.

The point in the process at which the pH of the mixture has dropped to below 4.6 is the earliest stage at which addition of high methoxyl pectin can be made thereto in order to achieve the desired results of the present invention. As described hereinafter, addition of pectin may alternatively be performed at a subsequent point in the process.

According to one embodiment of the present invention, high methoxyl pectin, substantially free of microorganisms, in substantially dry, i.e., nonhydrated, form is added to yogurt in a manner which achieves dispersion of the pectin throughout the yogurt while avoiding the need for any subsequent pasteurization by virtue of contamination introduced during the mixing. The dry pectin may be added to the yogurt immediately after the yogurt has been produced, i.e., the temperature of the yogurt being between about 40° C. to 50° C., preferably 45° C.; after the yogurt has been cooled (typically to 0° C. to 5° C.) to arrest acid development and bacterial growth; or at some stage in the process between these points.

The means utilized for ensuring adequate admixture and dissolution of the pectin throughout the yogurt must be such that microbial contamination is not thereby introduced into the product, since such contamination would necessitate resort to an undesired pasteurization step to achieve a sterile product. Suitable mixing techniques include those which avoid the incorporation of air into the product and which are mechanically simple so as not to present difficulties in maintaining sterile those surfaces thereof in contact with the product.

The preferred means for addition of pectin to the already prepared yogurt involves the use of a simple blending device followed by passage of the mixture through a low pressure homogenizer or a simple pressure relief valve employing pressures of from about 40 to 150 p.s.i. An additional expedient for achieving good dispersion and dissolution of the pectin in the yogurt to the yogurt.

According to a preferred embodiment of the invention, high methoxyl pectin is added to the yogurt in the form of an aqueous pectin solution. In this manner, it can be assured that contamination will not be introduced into the product by the pectin per se since the solution can itself be pasteurized prior to its addition to the yogurt. Moreover, addition of the high methoxyl pectin in this form enhances its dispersibility and dissolution throughout the yogurt.

The aqueous solution of high methoxyl pectin is prepared such that it contains up to about 5% high methoxyl pectin. Preferably, dry pectin is mixed with sucrose in a ratio of 1 to 5, added to hot water for rapid hydration, held at a sufficiently high temperature for a time sufficient to eliminate any contaminating organisms and then cooled to a temperature compatible with the temperature of the yogurt to which it will be added. The yogurt/pectin solution mixture is then subjected to mixing conditions, preferably low pressure homogenization or the like, to achieve dissolution of the pectin throughout the yogurt by means which do not thereafter necessitate heat treatment of the yogurt.

Whether or not the pectin is added dry or as an aqueous "solution," the pectin will not dissolve completely in the ordinary sense, but will form small but visible particles of hydrated pectin. When the yogurt containing these particles is homogenized at high pressure, 500 psi and above, these particles are no longer visible and, according to the art, have completely coated casein particles in the yogurt. When the yogurt containing dispersed, hydrated pectin is homogenized at low pressure (40–150 psi) the particles become smaller but are still visible. If it is subsequently heated, particles disappear, but as mentioned before it would not be true yogurt.

While the physical stability is excellent whether the yogurt with dispersed pectin is homogenized at high or low pressure, we have found that low pressure homogenization is also advantageous in that satisfactory stability can be achieved with somewhat less pectin. Thus, for a given desired viscosity, a high pressure homogenized product (500 p.s.i.) required 0.7% pectin, whereas a low pressure homogenized product required only 0.5%, thus reducing the ingredients cost with no loss in quality.

While it is easier to make a solution at lower concentration, such as 1–2%, it is desirable to add as little of the solution to the yogurt as possible in order to avoid diluting the yogurt excessively with the water. However, some dilution is unavoidable. If this results in reducing the percentage of yogurt ingredients, such as nonfat milk solids, to levels unacceptable for one reason or another, the yogurt itself is made with more nonfat milk solids than what the final product is to have.

The amount of high methoxyl pectin added to the yogurt to achieve the prevention of whey and solids separation and the advantages attendant therewith necessarily will vary depending upon the percentage of solids in the yogurt, the processing conditions employed, and the like. In general, however, it is found that utilization of from about 0.4% to about 0.7% pectin by dry weight based upon the overall solids content of the total product, and preferably 0.5% to 0.6%, will be sufficient to achieve the desired results.

Yogurt products containing high methoxyl pectin prepared according to the process of this invention possess excellent smooth texture, mouthfeel and physical stability over long periods of time and are free of any off-flavors or undesirable colors contributed by the pectin additive. Moreover, they are true yogurt products since no heat treatment is utilized after the yogurt is made. The yogurt products prepared according to this invention also may have various sweeteners, fruits, flavorants or colorants incorporated therein.

The yogurt products prepared according to this invention are of suitable viscosity to render them pourable and drinkable. An important feature of this invention is that the viscosity of the yogurt is not materially altered through addition of the pectin. Indeed, in sharp contrast to the stabilizing techniques employed heretofore, the physical stability of the high methoxyl pectin containing yogurts of the present invention is not directly related to the viscosity of the product. For example, if the pectin is mixed directly with the yogurt without first reducing the viscosity of the yogurt or homogenizing the pectin yogurt mixture at low pressure, a high viscosity product is obtained which, however, may separate entirely in one to three days. Further, an increase in the nonfat milk solids content of the yogurt will result in a higher viscosity of the product at a given pectin level, but without improving the physical stability over that of a product with less milk solids and less viscosity.

It has been found that a highly acceptable liquid yogurt is obtained if the nonfat milk solids are about 8.25% and the pectin content is about 0.4–0.7%, although products with slightly different characteristics and desirable for other purposes may be obtained from higher or lower combinations of nonfat milk solids and pectin.

It is possible to retain physical stability of the yogurt by simply adding sufficient amount of any stabilizer or blend of stabilizers. This is also true in the case of high methoxyl pectin. However, the resulting product would become too viscous to be a freeflowing liquid. If such a product is homogenized at very high pressures, the viscosity of the product will be too low, and the smooth and rich textures commonly associated with a conventional "firm type" yogurt will be lost. Low pressure homogenization of the high methoxyl pectin-stabilized yogurt therefore represents the best means for the manufacture of physically and microbiologically stable, unpasteurized, liquid yogurt.

SPECIFIC EMBODIMENTS

EXAMPLES 1 to 9

EXAMPLE 1

Preparation of Yogurt/No Stabilizer Added

Skim milk and whole milk were mixed in proportions to give a lowfat milk with 1.1% fat and heated to 82° C. for 30 minutes. The lowfat milk was then cooled to 45° C., an appropriate amount of a yogurt culture added, and incubated without stirring at 45° C. for about 5 hours, or until the pH reached 4.4.

The resulting firm yogurt curd was broken by stirring while cooling to 5° C. Some of the product was stirred at high speed for 3 hours, after which the viscosity had been reduced from about 2000 centipoises to 693. At 693 centipoises the product was too viscous.

A portion of the product was passed through a sterilized laboratory homogenizer at about 600 psi. This reduced its viscosity to about 80 centipoises.

Several samples of the homogenized product and several samples of the product which had been stirred for 3 hours were stored at 5° C. in glass bottles and the physical stability was observed. All samples showed wheying-off within seven days. This experiment demonstrated that stability was not achieved when stabilizers were deleted.

EXAMPLE 2

Use of Various Stabilizers in Liquid Yogurt

In order to select the most suitable stabilizer for liquid yogurt, a number of commercial stabilizers were evaluated in prepared yogurt. The liquid yogurt was prepared in the same manner described in Example 1. The stabilizers were added in amounts sufficient to give desired viscosity, cooled to 5° C., and incorporated into the yogurt by homogenization at 500 psi in a sterilized laboratory homogenizer. The resulting liquid yogurts were tasted and portions were then placed under observation in glass bottles for 5 weeks to see if wheying-off occurred. The results of these experiments are shown in TABLE I

TABLE I

| Stabilizer | Results of Using Various Stabilizers in Liquid Yogurt | | |
|---|---|---|---|
| | Evaluation | | |
| | Mouthfeel | Flavor | Stability After 5 Weeks |
| Citrus Pectin A (high methoxyl) | smooth | good | stable |
| Citrus Pectin B (high methoxyl) | smooth | good | stable |
| Apple Pectin (high methoxyl) | smooth | apple | stable |
| Citrus Pectin (low methoxyl) | smooth | good | whey-off |
| Gum Tragacanth | smooth | off | stable |
| Gum Guar | smooth | off | stable |
| Carrageenan A | smooth | good | whey-off |
| Carrageenan B | gritty | good | whey-off |
| Gum Arabic | smooth | good | whey-off |
| Gum Karaya | smooth | good | whey-off |
| Gum Ghatti | smooth | good | whey-off |
| Propylene Glycol Alginate | smooth | good | whey-off |
| Agar | smooth | good | whey-off |
| Gelatin | smooth | good | stable* |

*But viscosity increased significantly on aging.

These data show that the high methoxyl pectins are the most suitable for producing a physically stable liquid yogurt with smooth mouthfeel and freedom from off taste.

EXAMPLE 3

Comparative Results of Addition of Pectin Yogurt to Liquid Yogurt Before and After Preparation In Example 2 it was shown that high methoxyl pectin was quite satisfactory as a stabilizer for liquid yogurt when it was added after the yogurt was made. To determine if the pectin could be incorporated earlier in the process, 0.7% high methoxyl pectin was incorporated into the milk by mixing in a Waring blender before pasteurization and after pasteurization. In each case it was added to the milk when it was warm and also when it was cold.

The pectin-containing milk was then inoculated with a yogurt culture and incubated at 45° C. for 4 hours, when the pH of the milk had reached 4.4. The curd was broken by stirring, cooled to 5° C. and then homogenized at 500 psi. The product was gritty in mouthfeel and a protein precipitate was visible. When the same amount of pectin was added to a prepared yogurt, no grittiness nor protein precipitation was observed, and the product was smooth in mouthfeel. Thus, highly desirable results are achieved when the pectin is added after the incubation step.

EXAMPLE 4

Effect on Yogurt Product when High Pressure Homogenization is Employed

A commercial size batch of yogurt was made in the same manner described in Example 1. Pectin, 0.7% by weight of yogurt, was added in dry form via a funnel-centrifugal pump device and thoroughly dispersed in the yogurt at 45° C. The pectin-yogurt mixture was then homogenized at 500 psi in a commercially sanitized homogenizer and cooled to 5° C. The resulting product was somewhat too low in viscosity and become spoiled by yeast and mold in 3 weeks. This method is therefore not quite sufficiently good to provide a satisfactory commercial product.

EXAMPLE 5

Effect of Using High Pressure Homogenization versus Using Low Pressure Homogenization Yogurt was made by inoculating lowfat milk and incubating in the same manner described in Example 1. When a pH of 4.3 was reached, 0.7% of high methoxyl pectin was completely incorporated and the yogurt cooled to 5° C. Portions of this yogurt were then further processed by either homogenizing at 500 psig in a sterilized laboratory homogenizer or by passing it through a pressure-relief valve at 45 psig. The viscosities of the resulting yogurts are as shown below:

TABLE II

Comparison Using High Pressure Homogenization Versus Low Pressure Homogenization

| | Viscosity (Centipoises) at 5° C. |
|---|---|
| 0.7% pectin/500 psi | 241 |
| 0.7% pectin/45 psi | 468 |
| 0.5% pectin/45 psi | 234 |
| 0.5% pectin/500 psi | 150 |

It is apparent from the results shown in TABLE II that the viscosity of the liquid yogurt was much lower when the sample was homogenized at high pressure than at low pressure. Table II further shows that 0.5% pectin, incorporated at low pressure, is equivalent to 0.7% pectin, incorporated at high pressure. The samples all had excellent shelf stability for 6 weeks. Except for the sample at 150 centipoises, which was somewhat thin in mouthfeel, the samples were of suitable viscosity. Thus, good stability with desired viscosity can be obtained with less pectin if it is incorporated at low pressure than if it is incorporated by homogenizing at high pressure. This is a cost saving.

EXAMPLE 6

Adding Pectin in Dry Form and in Dissolved Form

Yogurt was made in the same manner described in Example 1. The curd was broken by stirring and cooled to 5° C. It was then divided into two portions.

To a first portion was added 0.6% pectin in dry form, to the second portion was added 0.6% pectin as a 4% solution. Water was added to the first portion to balance the water added with the pectin in the solution.

Each of these portions was divided into two portions, one of which was homogenized at 500 psi and the other passed through a pressure-relief valve at 50 psi.

All the samples were physically stable for 5 weeks, and all had viscosities appropriate for liquid yogurts. The samples homogenized at 500 psi were less viscous than those passed through the pressure-relief valve.

It was observed that samples passed through the pressure-relief valve had small particles of hydrated pectin therein when inspected closely, whereas in the samples homogenized at 500 psi, none were seen.

EXAMPLE 7

Pectin versus Viscosity, Liquid Yogurt

Liquid yogurt was made in the same manner described in Example 1. Pasteurized solutions of 2.9–5.0% (w/w) pectin were added to obtain pectin concentrations of 0.4–0.7% in the final products. The pectin solutions were mixed with the yogurt for 30 minutes by stirring and the mixture then passed through a pressure-relief valve at 50 psi. The viscosity values of the products appear in TABLE III.

TABLE III

% Pectin versus Viscosity of Liquid Yogurt

| % Pectin | Viscosity (Centipoises) Liquid Yogurt at 5° C. |
|---|---|
| 0.4% | 132 |

TABLE III-continued

% Pectin versus Viscosity of Liquid Yogurt

| % Pectin | Viscosity (Centipoises) Liquid Yogurt at 5° C. |
|---|---|
| 0.5 | 234 |
| 0.6 | 295 |
| 0.7 | 455 |

The products with 0.5 and 0.6% pectin had the optimum desired viscosity for liquid yogurt. The sample with 0.7% pectin was somewhat too thick, and the one at 0.4% was slightly too thin. All samples were physically stable for 5 weeks.

EXAMPLE 8

Preparation of Commercial Batch of Liquid Yogurt

A commercially homogenized batch consisting of 590 lbs. of a milk with 1.45% fat, 14 lbs. of nonfat dry milk, and 40 lbs. of sugar was heated to 82° C. for 30 minutes in a 200-gallon jacketed tank. After cooling to 45° C., one can (70 ml) of a commercial frozen yogurt culture concentrate (thawed) was added aseptically through an opening in the tank. The tank was fitted with a tight cover, through which sterilized air could be introduced into the headspace to avoid introducing contaminated air. After culturing at 45° C. for 5 hours, the made yogurt was stirred and cooled to 5° C.

In another tank (a jacketed 100-gallon tank) 118 lbs. of water were heated to approximately 90° C. with steam in the jacket of the tank. A mixture of high methoxyl pectin (6.2 lbs.) and sugar (25 lbs.) was added through a funnel into the water while being recirculated by a centrifugal pump. The pasteurized pectin solution was then cooled to 5° C. The solution contained 4% high methoxyl pectin by weight.

The cooled, pasteurized pectin solution was pumped into the 200-gallon tank containing cooled yogurt while being constantly stirred. Subsequently, the pectin-yogurt mixture was passed through a pressure-relief valve at 65 psi back into the 100-gallon tank. The resulting liquid yogurt was at optimum viscosity and was both physically and microbiologically stable for 6–7 weeks.

By calculation this product contained 0.66% pectin, 1.1% milkfat, and 9.1% nonfat dry milk solids.

EXAMPLE 9

A batch of liquid yogurt of commercial size and containing high methoxyl pectin was made in the same manner described in Example 8. To portions of this product were added in an aseptic manner 9.1% by weight of various pasteurized fruit preparations (i.e., strawberry, raspberry, peach, and blueberry).

These fruit flavored liquid yogurts had excellent mouthfeel, proper viscosity, and after six weeks showed no sigh of physical separation or microbial spoilage.

By calculation this product contained 0.6% pectin, 1.0% milkfat, and 8.25% nonfat dry milk solids.

What is claimed is:

1. In a method for preparing a liquid yogurt by inoculating pasteurized dairy ingredients with a bacterial culture to form a yogurt curd and homogenizing the curd to form the liquid yogurt, the improvement which comprises:

mixing the curd with a high methoxyl pectin after the pH of the curd has become less than 4.6 and before the curd is homogenized, to form a curd-pectin mixture, the amount of pectin being from about 0.4% to about 0.7% by weight relative to the solids content of the mixture, and passing the mixture through an homogenizing orifice at a pressure of from about 40 to 150 p.s.i. to produce a stabilized liquid yogurt.

2. A method according to claim 1 wherein said high methoxyl pectin is added to said curd in the form of a pasteurized aqueous solution of high methoxyl pectin.

3. A method according to claim 1, wherein said high methoxyl pectin is substantially dry and substantially free of microorganisms when it is added to said curd.

4. The method according to claim 3, wherein said high methoxyl pectin is dry mixed with sugar prior to said pectin's addition to said curd.

5. The method according to claim 4, wherein said sugar is sucrose.

6. The method according to claim 2 wherein said solution of high methoxyl pectin contains up to about 5% pectin by weight.

7. The method according to claim 2 wherein the aqueous solution also contains sucrose in a dry weight ratio of 1:1 to 5:1 relative to the high methoxyl pectin in the solution.

* * * * *